United States Patent [19]

Takahashi

[11] Patent Number: 5,469,831
[45] Date of Patent: Nov. 28, 1995

[54] FUEL SUPPLY CONTROL SYSTEM FOR AN AUTOMOTIVE ENGINE

[75] Inventor: Tatsuhiko Takahashi, Himeji, Japan

[73] Assignee: Mitsubishi Denki Kabushiki Kaisha, Tokyo, Japan

[21] Appl. No.: 339,194

[22] Filed: Nov. 10, 1994

[30] Foreign Application Priority Data

Nov. 12, 1993 [JP] Japan ................................ 5-283376

[51] Int. Cl.⁶ .................................................... F02D 41/16
[52] U.S. Cl. ............................................. 123/680; 123/494
[58] Field of Search ..................................... 123/679, 680, 123/689, 1 A, 494

[56] References Cited

U.S. PATENT DOCUMENTS

| | | | |
|---|---|---|---|
| 5,060,619 | 10/1991 | Sakurai et al. | 123/494 |
| 5,065,727 | 11/1991 | Sakaguchi et al. | 123/680 |
| 5,140,965 | 8/1992 | Nogi et al. | 123/494 |
| 5,170,763 | 12/1992 | Kitajima et al. | 123/494 |
| 5,191,869 | 3/1993 | Kamioka et al. | 123/494 |
| 5,229,946 | 7/1993 | Ghaem | 123/494 |
| 5,253,630 | 10/1993 | Akazaki et al. | 123/680 |
| 5,301,648 | 4/1994 | Uchinami | 123/494 |

FOREIGN PATENT DOCUMENTS

201045 8/1990 Japan.
294266 10/1992 Japan.

*Primary Examiner*—Willis R. Wolfe
*Attorney, Agent, or Firm*—Sughrue, Mion, Zinn, Macpeak & Seas

[57] ABSTRACT

A fuel supply control system for an automotive engine determines a property of the fuel, such as the fifty percent distillation temperature $T_{50}$ thereof, and the fuel injectors of the engine are controlled in accordance with the determined fuel property. When the engine is idling and the coolant water temperature WT of the engine is decreasing, the amplitude X of the feedback correction factor $K_2$ for proportional-plus-integral control action is measured a number of times, and an average amplitude $X_0$ thereof is calculated. The property of said fuel is determined on the basis of the thus calculated average amplitude $X_0$ and the coolant water temperature WT using a two-dimensional map which gives the value of $T_{50}$ as a function of the amplitude X of the feedback correction factor $K_2$ and the coolant water temperature WT. The thus determined index $T_{50}$ is stored in a RAM backed up by a battery. When a new fuel is supplied to the fuel tank, the value of index $T_{50}$ is cleared to determine the index afresh.

6 Claims, 5 Drawing Sheets

FUEL SUPPLY CONTROL SYSTEM FOR AN AUTOMOTIVE ENGINE

BACKGROUND OF THE INVENTION

This invention relates to fuel supply control systems for automotive engines, and more particularly to fuel supply control systems which are capable of judging the property of the fuel (e.g., the 50 percent distillation temperature which represents the volatility of the fuel, or the octane number which measures the anti-knock property of the fuel) and adjusting the amount of fuel supplied to the engine on the basis of the judgment.

A control device for an automotive engine which judges the property of the fuel is disclosed by Japanese Laid-Open Patent, (Kokai) No. 2-201045. The device includes an exhaust gas sensor and a linear air/fuel ratio sensor. The exhaust gas sensor detects the concentration of a particular gas (the oxygen gas $O_2$) and outputs a signal whose level is inverted each time when the ratio of the air/fuel mixture supplied to the engine crosses the theoretical air/fuel ratio (i.e., when the air/fuel ratio falls from the rich to the lean, or rises from the lean to the rich, across the theoretical). The linear air/fuel ratio sensor outputs a signal whose level is proportional to the air/fuel ratio, which is measured by the oxygen gas concentration of the exhaust gas. Each time the output of the exhaust gas sensor is inverted, the control means for controlling the air/fuel ratio judges the property of the fuel on the basis of the output of the linear air/fuel ratio sensor.

Figure 6:
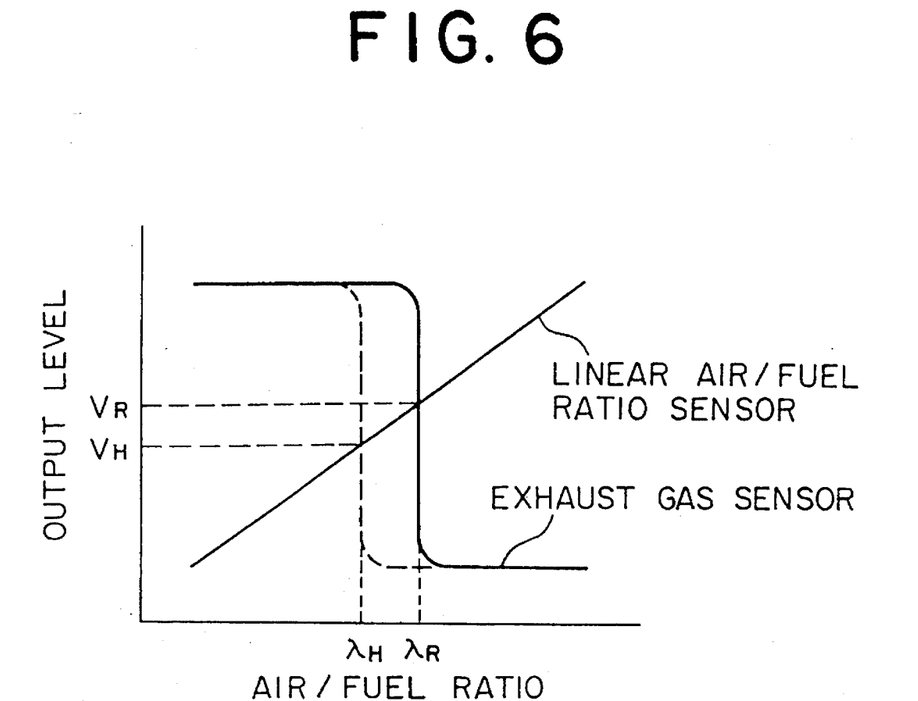
FIG. 6 is a diagram showing the levels of the outputs of the exhaust gas sensor and the linear air/fuel ratio sensor disclosed in Japanese Laid-Open Patent (Kokai) No. 2-201045.

In the case of the device according to Japanese Laid-Open Patent (Kokai) No. 2-201045, the control means receives outputs from the exhaust gas sensor and the linear air/fuel ratio sensor, and reads the state of the output signal of the linear air/fuel ratio sensor when the output of the exhaust gas sensor is inverted. FIG. 6 is a diagram showing the levels of the outputs of the exhaust gas sensor and the linear air/fuel ratio sensor disclosed in Japanese Laid-Open Patent (Kokai) No. 2-201045. The theoretical air/fuel ratios $\lambda_R$ and $\lambda_H$ for the regular fuel and the high-octane-number fuel, respectively, are different. When the fuel is of the regular type, the output of the linear air/fuel ratio sensor is inverted at the theoretical air/fuel ratio $\lambda_R$ (solid curve). When, on the other hand, the fuel is of a high-octane-number type, the output of the linear air/fuel ratio sensor is inverted at the theoretical air/fuel ratio $\lambda_H$ (dotted curve). Thus, the control means judges the property of the fuel on the basis of the output level, $V_H$ and $V_R$, of the linear air/fuel ratio sensor at the inversion of the output of the exhaust gas sensor, which varies depending on the property of the fuel.

Another control device for an automotive engine is disclosed in Japanese Laid-Open Patent (Kokai) No. 4-294266. Using the proportional-plus-integral control method, the control device controls the amount of the fuel injected into the engine to adjust the air/fuel ratio to the target level. The control is based on the difference between the target and the actual air/fuel ratio fed back from the air/fuel ratio sensor. The control periods, f40 and f80, of the proportional-plus-integral control at the low and the high water temperatures, 40° C. and 80° C., of the engine are measured, and the difference Δf80-40 between the control periods f80 and f40 at the two temperatures is calculated. Assuming that the operating conditions of the engine other than the coolant water temperature are the same, the difference Δf80-40 is smaller when the fuel is of the lighter quality (i.e., more volatile) than when the fuel is of the heavier quality (i.e., less volatile). Thus, the property or the volatility of the fuel can be determined from the difference between the control periods of the proportional-plus-integral control at the low and the high water temperatures.

The control device disclosed in the first-mentioned Japanese Laid-Open Patent (Kokai) No. 2-201045 has the following disadvantage. The theoretical air/fuel ratio depends on the property of the fuel. However, when the air/fuel mixture is combusted at the theoretical air/fuel ratio, the oxygen gas concentration contained in the exhaust gas is at the same level irrespective of the property of the fuel. Thus, if the output of the linear air/fuel ratio sensor detecting the oxygen concentration contained in the exhaust gas is read in by the control means upon inversion of the air/fuel ratio across the theoretical ratio, the output of the linear air/fuel ratio sensor read in by the control means remains at the same level irrespective of the property of the fuel. Thus, the output level of the linear air/fuel ratio sensor does not vary as shown in FIG. 6. Rather, irrespective of the variation of the theoretical air/fuel ratio due to the difference in the property of the fuel, the output of the linear air/fuel ratio sensor is at the same level at the inversion of the air/fuel ratio across the theoretical, provided that the linear air/fuel ratio sensor detects the oxygen concentration contained in the exhaust gas. Thus, an accurate judgment of the property of the fuel is difficult.

The control device of the second-mentioned Japanese Laid-Open Patent (Kokai) No. 4-294266, on the other hand, has the following disadvantage. The property of the fuel is determined from the difference between the control periods of the proportional-plus-integral control at the low and the high water temperatures of the engine, 40° C. and 80° C. The control period depends, however, not only on the water temperature but also on other operating condition of the engine. Thus the difference between the control periods at the low and the high water temperatures does not represent the property of the fuel accurately.

SUMMARY OF THE INVENTION

It is therefore an object of this invention to provide a fuel supply control system for an automotive engine which is capable of judging the property of the fuel accurately, and adjusting the amount of fuel injected into the engine on the basis of the judged property of the fuel, such that, even when a fuel of heavy quality is used, the output power of the engine is maintained and the noxious components in the exhaust gas are suppressed.

The above object is accomplished in accordance with the principle of this invention by a fuel supply control system for an internal combustion engine, comprising:

fuel supply means for supplying a fuel to the internal combustion engine;

air/fuel ratio sensor means for detecting an air/fuel ratio of a mixture of air and fuel supplied to the internal combustion engine; and fuel supply control means, having an input coupled to the air/fuel ratio sensor means, for controlling the fuel supply means to adjust the air/fuel ratio to a theoretical ratio using a feedback control method based on an output of the air/fuel ratio sensor means; wherein the fuel supply control means includes: feedback correction factor calculation means for calculating a feedback correction factor from a deviation of the air/fuel ratio detected by the air/fuel ratio sensor means from the theoretical ratio; amplitude measurement means for determining an amplitude of the feedback correction factor;

and fuel property judgment means for determining a property of the fuel on the basis of the amplitude of the feedback correction factor; the fuel supply control means controlling the fuel supply means in accordance with the property of the fuel determined by the fuel property judgment means.

Preferably, the fuel supply control system further comprises: an idling detector means for detecting an idling state of the internal combustion engine; wherein the fuel supply control means has an input coupled to the idling detector means and the amplitude measurement means determines the amplitude of the feedback correction factor during a time when the idling detector means detects an idling state of the internal combustion engine. Further, it is preferred that the fuel supply control system comprise: temperature sensor means for detecting a temperature of the internal combustion engine; wherein the fuel property judgment means has an input coupled to the temperature sensor means and determines the property of the fuel on the basis of the amplitude of the feedback correction factor and the temperature of an internal combustion engine detected by the temperature sensor means. Furthermore, it is preferred that the fuel supply control system comprises: fuel storage means for storing the fuel supplied by the fuel supply means to the internal combustion engine; and fuel storage supply detector means for detecting an occurrence of fuel supply to the fuel storage means; wherein the fuel supply control means has an input coupled to the fuel storage supply detector means and includes memory means for storing the property of the fuel determined by the fuel property judgment means, the fuel supply control means deleting the property of the fuel from the memory means when the fuel storage supply detector means detects an occurrence of fuel supply to the fuel storage means. The memory means may consist of a RAM backed up by a battery. Still further it is preferred that the amplitude measurement means determines an average of a plurality of amplitudes of the feedback correction factor, and the fuel property judgment means determines the property of the fuel on the basis of the average amplitude of the feedback correction factor.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

FIG. 5a is a flowchart showing a first half of the procedure for determine the property of the fuel according to this invention, executed periodically by a timer interrupt, etc., after the power of the control unit 14 is turned on;

FIG. 5b is a flowchart showing the second half of the procedure executed subsequent to the part of FIG. 5a;

In the drawings, like reference numerals represent like or corresponding parts or portions.

DETAILED DESCRIPTION OF THE PREFERRED EMBODIMENTS

Referring now to the accompanying drawings, the preferred embodiments of this invention are described.

Figure 1:
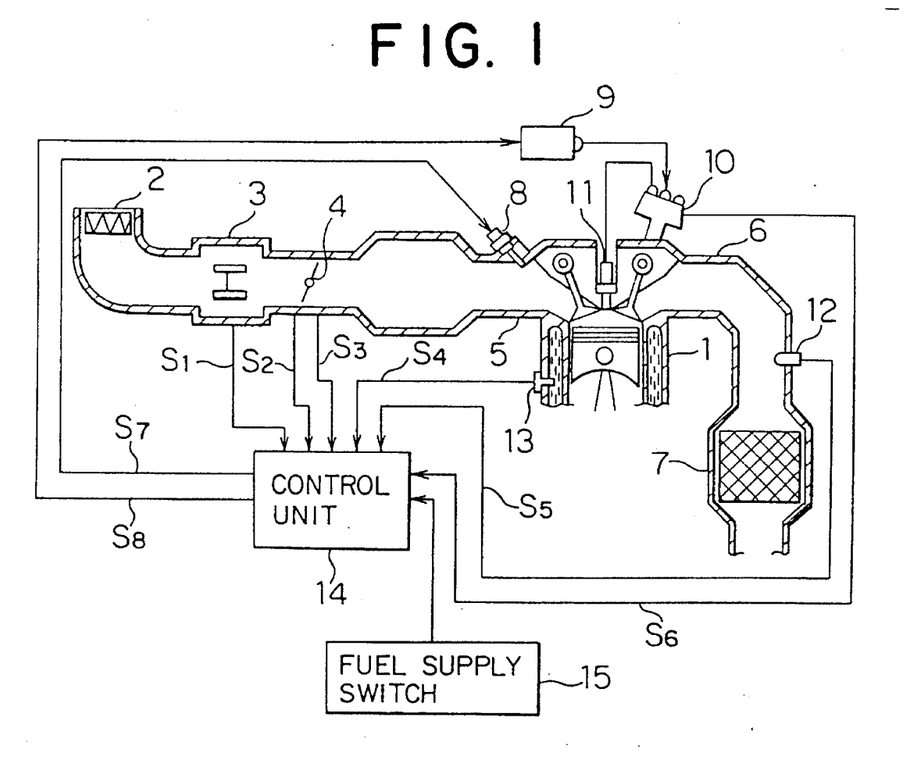
FIG. 1 is a block diagram showing the overall structure of a fuel supply control system for an automotive engine according to this invention.

FIG. 1 is a block diagram showing the overall structure of a fuel supply control system for an automotive engine according to this invention. Within the cylinders of an internal combustion engine 1 is combusted the air/fuel mixture to generate mechanical power. The air taken into the internal combustion engine 1 is first cleaned by an air cleaner 2. An air flow sensor 3 measures the amount of air taken into the air intake pipe 5, and outputs an air intake amount signal $S_1$ corresponding to the amount of air taken in.

A throttle valve 4, interlocked with the accelerator pedal (not shown) of the vehicle, adjusts the amount of air intake in accordance with the load of the internal combustion engine 1. The throttle valve 4 outputs a throttle position signal $S_2$ corresponding to the position of the throttle. The air is taken into the internal combustion engine 1 through an air intake pipe 5. The exhaust gas from the internal combustion engine 1 is exhausted through an exhaust pipe 6. A catalytic converter Rhodium (CCRO) 7 cleans the exhaust gas by removing the noxious components HC, CO, and NOx simultaneously.

An amount of fuel corresponding to the amount of air as measured by the air flow sensor 3 is injected from the injectors 8 into the air intake pipe 5 toward the respective cylinders of the engine in accordance with the injector drive signal $S_7$. In response to the ignition signal $S_7$, the ignition coil 9 generates the high voltage distributed through a distributor 10 to the ignition plugs 11 within respective cylinders of the engine such that a spark is generated to combust the air/fuel mixture within respective cylinders. The distributor 10 includes a crank angle sensor (not shown) for generating an output signal $S_6$, on the basis of which the RPM of the engine is calculated. An air/fuel ratio sensor 12 detects the oxygen gas concentration contained in the exhaust gas of the engine, and outputs a bi-level signal $S_5$ on the basis of the measured oxygen concentration. The level of the output signal $S_5$ of the air/fuel ratio sensor 12 is inverted, for example, from 1 V to 0 V and from from 0 V to 1 V when it is determined, on the basis of the measured oxygen concentration, that the air/fuel ratio is inverted (i.e., rises or falls) across the theoretical air/fuel ratio.

A water temperature sensor 13 measures the temperature of the coolant water within the jacket surrounding the cylinders of the engine. The water temperature sensor 13 outputs a water temperature signal $S_4$ corresponding to the measured water temperature. Based on the signals received from the respective sensors, including an idling signal $S_3$ from an idling switch (not shown), the control unit 14 calculates the amount of fuel injection and the ignition timings. In particular, control unit 14 determines the property of the fuel, and adjusts the correction factor for the air/fuel ratio feedback on the basis of the determined property of the fuel. A fuel supply switch 15 detects an occurrence of the supply of fuel to the fuel tank (not shown).

Next, the operation of the fuel supply control system of FIG. 1 is described. Based on the amount of air intake Qa into the internal combustion engine 1 as determined from the air intake amount signal $S_1$ output from the air flow sensor 3 and also on the RPM of the engine Ne as determined from the signal $S_6$ output from the crank angle sensor within the distributor 10, the control unit 14 calculates the fundamental fuel injection pulse width Ta using the following equation (1):

$$Ta = Qa/Ne - K \quad (1)$$

Further, the control unit 14 effects miscellanous corrections such as the water temperature correction, etc., by multiplying the miscellaneous correction factor $K_1$ with the fundamental fuel injection pulse width Ta. Furthermore, using the following equation (2), the control unit 14 obtains the corrected fuel injection pulse width Ti for driving the injectors 8, corresponding to the corrected amount of fuel injection, by multiplying with the feedback correction factor $K_2$ of the proportional-plus-integral control for the air/fuel ratio based on the signal $S_5$ output from the air/fuel ratio sensor 12:

$$Ti = Ta \cdot K_1 \cdot K_2 \quad (2)$$

Figure 3:
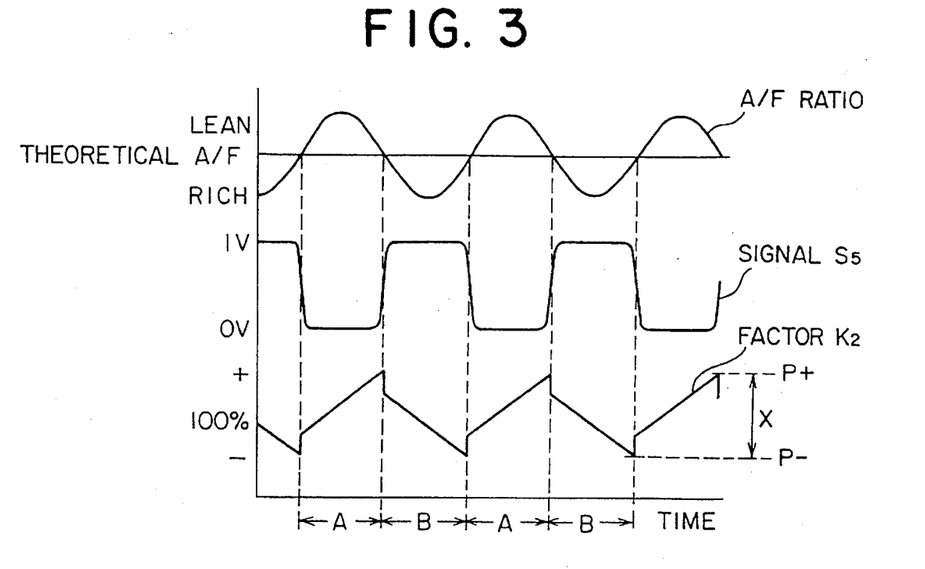
FIG. 3 is a diagram showing the waveforms of the air/fuel ratio, the output $S_5$ of the air/fuel ratio sensor, and the level of the feedback correction factor $K_2$, in the case where a light quality fuel is used.
Figure 4:
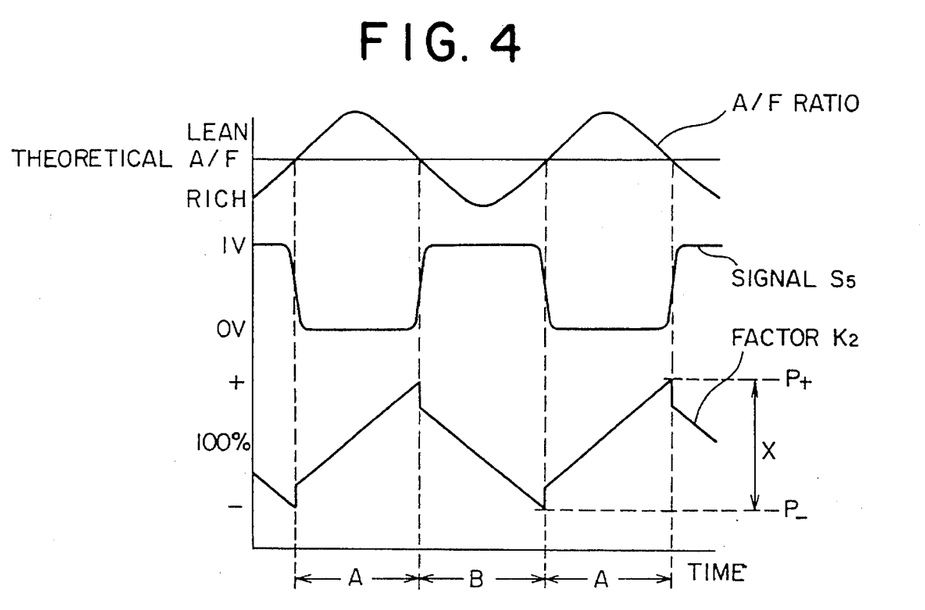
FIG. 4 is a diagram similar to FIG. 3, but showing the case where a heavy quality fuel is used.

Next, the air/fuel ratio feedback control is described by reference to FIGS. 3 and 4. In FIGS. 3 and 4, the air/fuel ratio varies sinusoidally around the theoretical air/fuel ratio. As the air/fuel ratio crosses (i.e., falls or rises across) the theoretical level, the output $S_5$ of the air/fuel ratio sensor is inverted. Thus, when the air/fuel ratio rises above the theoretical and becomes lean (in intervals A in FIGS. 3 and 4), the output $S_5$ of the air/fuel ratio sensor 12 falls to about 0 V (referred to as the lean signal). During the intervals A, the feedback correction factor $K_2$ for the proportional-plus-integral control is increased toward the positive, such that the corrected fuel injection pulse width Ti of equation (2) is increased to augment the amount of injected fuel.

On the other hand, when the air/fuel ratio falls below the theoretical and becomes rich (intervals B), the output $S_5$ of the air/fuel ratio sensor 12 rises to about 1 V (referred to as the rich signal). During the intervals B, the feedback correction factor $K_2$ for the proportional-plus-integral control is decreased toward the negative, such that the corrected fuel injection pulse width Ti is narrowed to decrease the amount of injected fuel. It is noted that the inversion of the output signal $S_5$ of the air/fuel ratio sensor 12 from the rich to the lean and from the lean to the rich takes place at the same oxygen concentration in the exhaust gas (the concentration obtained when the air/fuel ratio is at the theoretical) irrespective of the property of the fuel.

The volatility of the heavy fuel is smaller than that of the light fuel. Thus, when the heavy fuel is injected from the injectors 8, a larger amount of fuel is adhered to and hence retained temporarily on the walls of the air intake pipe 5 before taken into the cylinders of the engine. The introduction of the heavy fuel into the cylinders is thus retarded. Consequently, the response of the air/fuel ratio control becomes slower for the heavier fuel. Thus, in the case of the heavier fuel (FIG. 4), once the air/fuel ratio rises across the theoretical from the rich to the lean side, it takes a longer time before the increasing level of the feedback correction factor $K_2$ takes effect (during intervals A) and the air/fuel ratio returns to the theoretical. Thus, the intervals A are longer in FIG. 4 than in FIG. 3. Similarly, in the case of the heavier fuel, once the air/fuel ratio falls across the theoretical from the lean to the rich side, it takes a longer time before the decreasing level of the feedback correction factor $K_2$ (during intervals B) takes effect and the air/fuel ratio returns to the theoretical. Thus, the intervals B are longer in FIG. 4 than in FIG. 3.

The control intervals A during which the air/fuel ratio is above the theoretical and the feedback correction factor $K_2$ is increased toward the positive, and the control intervals B during which the air/fuel ratio is below the theoretical and the feedback correction factor $K_2$ is decreased toward the negative are both longer when the fuel is heavy (FIG. 4) than when the fuel is light (FIG. 3). When the feedback correction factor $K_2$ is controlled by means of the proportional-plus-integral control method, the control period thus becomes longer when the fuel is heavy than when it is light. The amplitude X of the variation of the feedback correction factor $K_2$ also becomes greater when the fuel is heavy, due to the integral gain accumulated during the longer half control periods A or B. Namely, the gain of the feedback control corresponding to the integral portion of the proportional-plus-integral control rises to a greater value when the fuel is heavy. The amplitude X of the feedback correction factor $K_2$ corresponds to the length of the intervals A or B during which the feedback correction factor $K_2$ is increased or decreased. The property of the fuel can thus be determined on the basis of the amplitude X of the feedback correction factor $K_2$.

The amplitude X of the feedback correction factor $K_2$, however, may depend on the operating condition of the engine as well as on the property of the fuel. For example, the amount of the fuel adhered and temporarily retained on the walls of the air intake pipe 5 may depend on the operating condition of the engine such as the temperature of the coolant water, and hence the amplitude X may be varied. The amplitude X may also vary depending on the idling or the non-idling state of the engine. The gain for the air/fuel ratio feedback correction may be varied accordingly. Thus, in the case where the property of the fuel is determined on the basis of the amplitude X of the feedback correction factor $K_2$, it is preferred that the determination of the amplitude X is performed during the time when the operating condition is stable such as during the idling state.

Figure 5A:
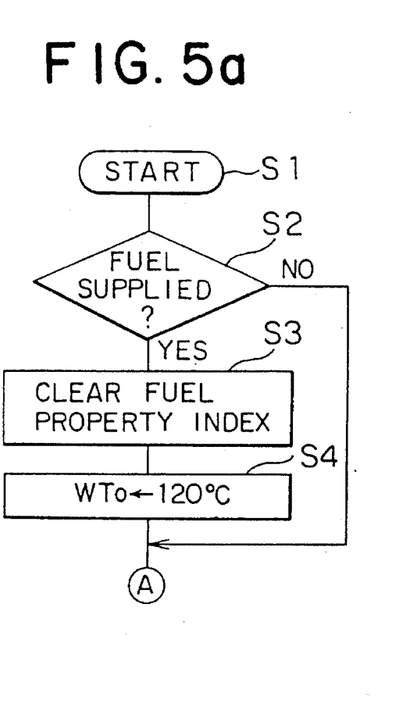
Figure 5B:
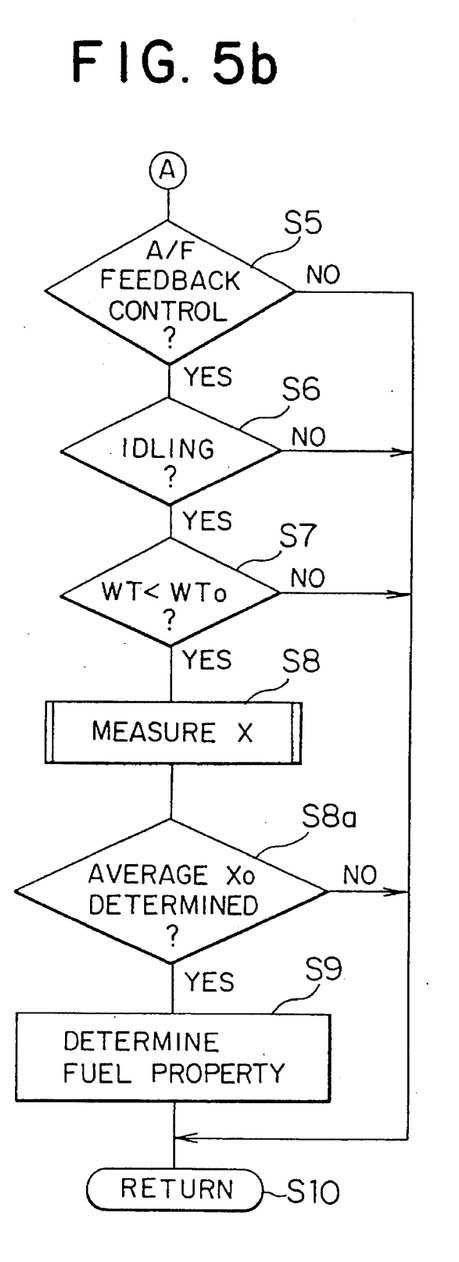
Figure 5C:
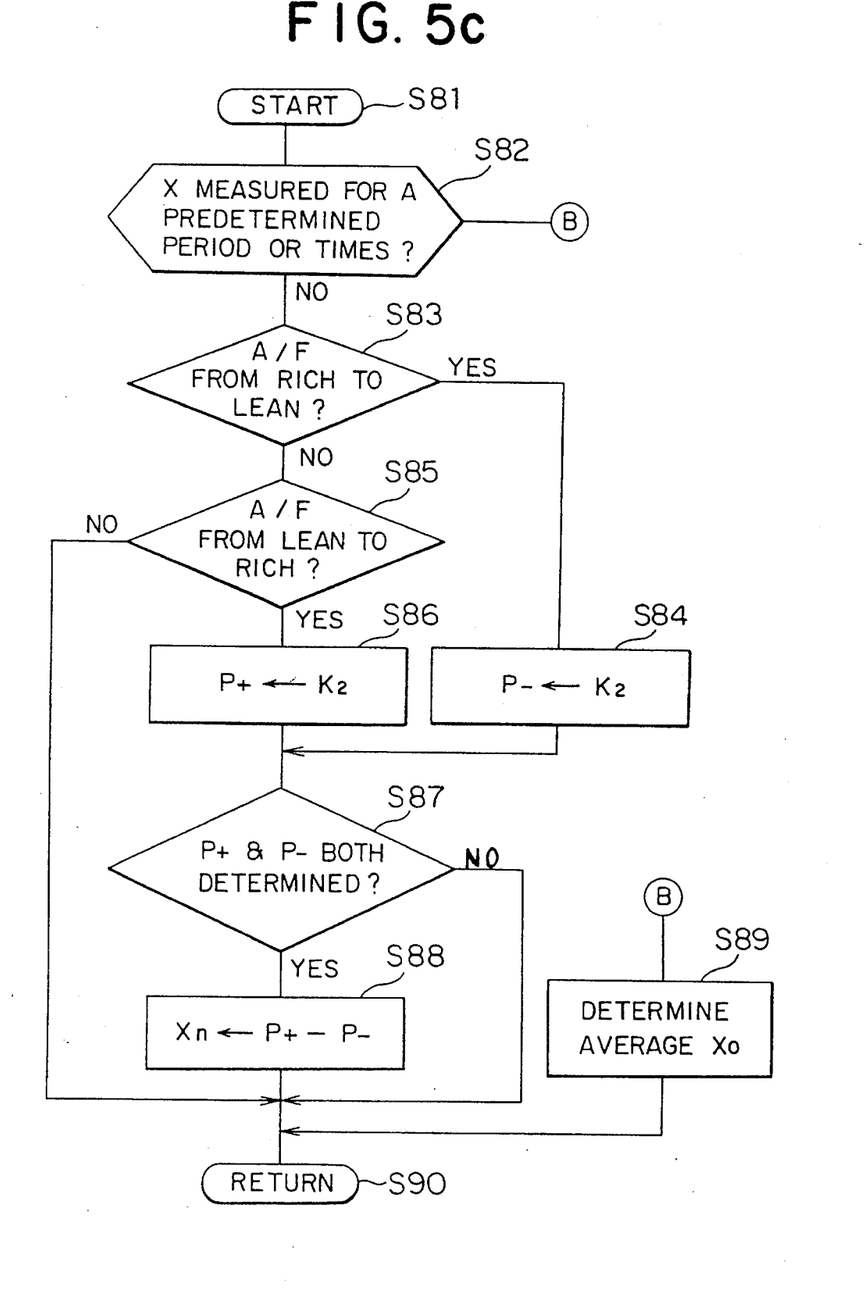
FIG. 5c is a flowchart showing the detail of step S8 of FIG. 5b.

FIGS. 5a through 5c shows the flowcharts representing the procedure for determining the property of the fuel according to this invention. The procedure can determine the property of the fuel accurately in spite of the fact that the amplitude X of the feedback correction factor $K_2$ depends on the operating condition of the internal combustion engine 1. FIG. 5a is a flowchart showing a first half of the procedure for determine the property of the fuel according to this invention, executed periodically by a timer interrupt, etc., after the power of the control unit 14 is turned on. FIG. 5b is a flowchart showing the second half of the procedure executed subsequent to the part of FIG. 5a. FIG. 5c is a flowchart showing the detail of step $S_8$ of FIG. 5b. The program for determining the property of the fuel is stored in the ROM (read-only memory) within the control unit 14, and executed by a microcomputer thereof. Variable data items used by the program, as described below, are stored in the RAM within the control unit 14.

After the start at step S1, it is judged whether or not the fuel is supplied at step S2, and the steps S3 and S4 are executed when fuel is supplied to the fuel tank. The steps S2 through S4 are described in detail hereinbelow. At step S5, it is judged whether or not the feedback control for controlling the air/fuel ratio to the theoretical is currently to be performed. The feedback control is not performed when the air/fuel mixture is controlled to the rich composition, such as when the engine is started or when the vehicle is being accelerated. If the judgement is negative at step S5, the execution proceeds directly to step S10 without executing the steps S6 through S9 for determining the property of the fuel. Then, the execution returns to the main control routine (not shown), such that the procedure of FIGS. 5a through 5c is resumed after a predetermined time.

When, on the other hand, the judgment is affirmative at step S5, the execution proceeds to step S6, where the idling signal $S_3$ is read in and it is judged whether or not the engine is currently idling. If the judgement is negative at step S6 (if the engine is not idling), the execution proceeds directly to step S10 to return to the main routine without performing the steps S7 through S9 for determining the property of the fuel.

On the other hand, if the judgement is affirmative at step S6, the execution proceeds to step S7, where the current water temperature WT is determined on the basis of the water temperature signal $S_4$, and it is judged whether or not the current water temperature WT is lower than the water temperature $WT_0$ of the previous measurement. After the judgment, the variable $WT_0$ is updated (i.e., assigned the new value WT). The variable $WT_0$ is stored in the RAM backed up by a battery such that the value of the $WT_0$ is not lost even when the electrical system of the vehicle is turned off. If the judgement is negative at step S7, the execution proceeds directly to step S10 to return to the main routine without performing the steps S8 through S9 for determining the property of the fuel. On the other hand, if the judgement is affirmative at step S7, the execution proceeds to step S8, where the amplitude X of the feedback correction factor $K_2$ and, after a number of execution cycles of the procedure of FIGS. 5a through 5c, the average $X_0$ of amplitudes X, are determined. The determination of the amplitude X and the average $X_0$ is described in detail below.

At step S8a, it is judged whether or not the average amplitude $X_0$ has been determined. If the judgement is affirmative at step S8a, the execution proceeds to step S9, where the property of the fuel is determined from the average amplitude $X_0$. At step S8, a number of amplitudes X of the feedback correction factor $K_2$ are determined under the favorable condition where the engine is idling and the water temperature is appropriate. The determination of the property of the fuel is based on the average amplitude $X_0$ of a number of amplitudes X. Thus the property of the fuel can be determined accurately.

Next, the detail of step S8 of FIG. 5b is described by referring to FIG. 5c.

After the start at step S81, the execution proceeds to step S82, where it is judged whether or not the amplitudes X have been determined over a predetermined length of time. Alternatively, it is judged whether or not a predetermined number of the amplitudes X have been determined.

If the judgement is affirmative at step S82, the execution proceeds to step S89, where the average $X_0=\Sigma X/N$ of the amplitudes X, where N is the number of the determined amplitudes X, is calculated. After step S89, the execution returns to step SSa of FIG. 5b via the step S90. Under such circumstances, the judgment at step S8a is affirmative, since the average amplitude $X_0$ has already been determined at step S89, and hence the execution proceeds to step S9 to determine the property of the fuel.

On the other hand, if the judgement is negative at step S82, the execution proceeds step S83, where it is judged whether or not the air/fuel ratio has inverted from the rich to the lean side. Namely, it is judged whether or not the the level of the output signal $S_5$ of the air/fuel ratio sensor 12 has fallen from above 0.45 V to below 0.45 V. If the judgement is affirmative at step S83, the value of the feedback correction factor $K_2$ is at the bottom or minus peak P− (see FIGS. 3 and 4), and hence the execution proceeds to step S84, where the minus peak variable P− is assigned the current value of the feedback correction factor $K_2$. Namely, the current value of the feedback correction factor $K_2$ is stored at an address of the RAM (random access memory) of the control unit 14 for storing the variable P−. It is noted that the minus peak P− of the feedback correction factor $K_2$ correspond to the inversion point of the air/fuel ratio, since the effect of the bottom value of the feedback correction factor $K_2$ appears only after a certain delay as the actual value of the air/fuel ratio.

On the other hand, if the judgement is negative at step S83, the execution proceeds to step S85, where it is judged whether or not the air/fuel ratio has inverted from the lean to the rich side. Namely, it is judged whether or not the level of the output signal $S_5$ of the air/fuel ratio sensor 12 has risen from below 0.45 V to above 0.45 V. If the judgement is affirmative at step S83, the value of the feedback correction factor $K_2$ is at the top or plus peak P+ (see FIGS. 3 and 4), and hence the execution proceeds to step S86, where the plus peak P+ is assigned the current value of the feedback correction factor $K_2$. Namely, the current value of the feedback correction factor $K_2$ is stored at an address of the RAM of the control unit 14 for storing the variable P+.

On the other hand, if the judgement is negative at step S85, the execution proceeds to step S90 and thence to the step S8a of FIG. 5b. Under such circumstances, the judgment is negative at step S8a, and hence the execution proceeds directly step S10 to terminate the procedure for determining the property of the fuel. The procedure of FIGS. 5a through 5c is resumed after a predetermined interval from the start at step S1.

After step S84 or step S86, the execution proceeds to step S87, where it is judged whether or not both the plus and minus peaks P+ and P− are determined. If the judgement is affirmative, the execution proceeds to step S88, where the amplitude Xn (Xn represents the amplitude X calculated at the nth time) is assigned the difference P+− P− between the plus and the minus peaks. Namely, the the difference P+-P− is stored at the variable Xn in the RAM of the control unit 14. Then, the suffix n for the amplitude Xn is incremented, and the variables P+ and P− are cleared, and the execution proceeds to step S90 and thence to step S8a. On the other hand, if the judgement is negative at step S87, the execution proceeds directly to step S90 and thence to step S8a. In either case, the judgment at step S8a is negative and hence the the execution proceeds to step S10 to terminate the procedure for determining the property of the fuel. The procedure of FIGS. 5a through 5c is resumed from the start at step S1 after a predetermined interval of time.

Thus, the procedure of FIGS. 5a through 5c is repeated until the judgment at step S82 finally becomes affirmative. Then, the execution proceeds to step S89, where the average amplitude $X_0=\Sigma Xn/N$ is calculated, where N is the number of the calculations of the amplitudes Xn at step S87 during the repeated execution of the procedure (i.e., n=1, 2, ..., N).

Figure 2:
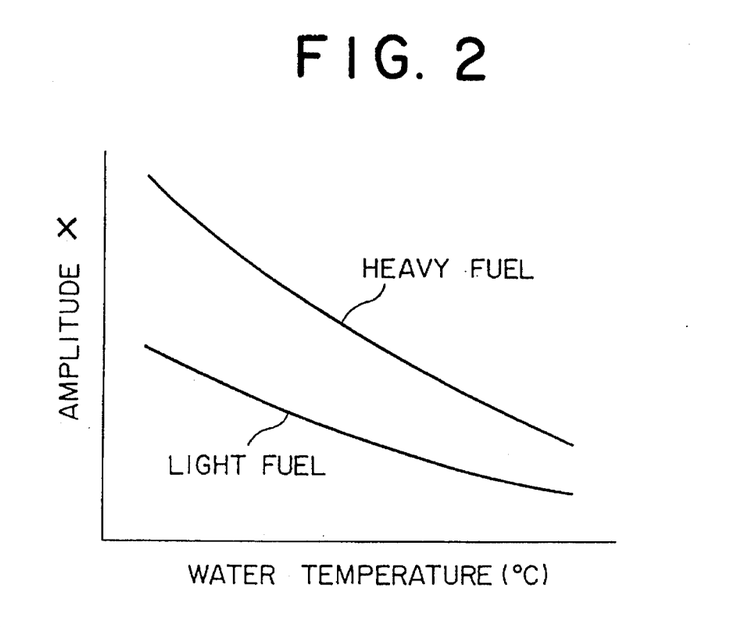
FIG. 2 is a diagram showing the relationship between the temperature of the coolant water of the engine and the amplitude X of the feedback correction factor $K_2$, the two curves showing the relationships for the heavy and the light quality fuel, respectively.

FIG. 2 is a diagram showing the relationship between the temperature of the coolant water of the engine and the amplitude X of the feedback correction factor $K_2$, the two curves showing the relationships for the heavy and the light quality fuel, respectively. As shown in FIG. 2, the amplitude X depends not only on the property of the fuel, but also on the temperature of the coolant water. Thus, the determination of the property of the fuel at step S9 of FIG. 5b is effected as follows. A two-dimensional map of the value of the index of the property of the fuel (the 50 percent distillation temperature $T_{50}$ of the fuel) with respect to the two parameters of the water temperature WT and the amplitude X (i.e., a table showing the value of $T_{50}$ in relation to the amplitude X and the temperature WT) is stored beforehand in the ROM (read-only memory) of the control unit 14, such that the value of $T_{50}$ can be read out on the basis of the values of X and WT. Here, the 50 percent distillation temperature $T_{50}$ is used as the index of the property of the fuel. At step S9, the temperature $T_{50}$ corresponding to the average amplitude $X_0$ and the water temperature WT is read out of the ROM and is stored at the variable $T_{50}$ within the RAM of the control unit 14 which is backed up by a battery such that the value of $T_{50}$ will not be lost after the ignition switch is turned off. In the execution of the main control routine, the pulse width of the fuel injection is corrected in accordance with the value of $T_{50}$ which represents the property of the fuel as determined by the procedure of FIGS. 5a through 5c. For example, the value of the miscellaneous correction factor $K_1$ in the above equation (2) may be corrected in accordance with the fuel property index $T_{50}$.

Next steps S2 through S4 of FIG. 5a is described. When a new fuel of different property is supplied to the fuel tank, the property of the fuel supplied to the engine may be changed abruptly. Under such circumstances, if the air/fuel ratio control is performed on the basis of of the fuel property determined before the fuel supply, the performance of the system may become worse because of the additional correction based on the fuel property. To prevent the deterioration of the operating performance, it is necessary to determine the fuel property afresh as soon as possible, and, while the property of the new fuel is not yet determined, to disable the correction based on the property of the fuel. Thus, after the start of the procedure, it is judged at step S2 whether or not the fuel is supplied to the fuel tank. When, for example, the fuel supply cap of the tank (not shown) is opened to supply a new fuel, or when it is detected that the amount of fuel contained in the fuel tank has increased abruptly, the fuel supply switch 15 is activated to inform the control unit 14 that an amount of new fuel is supplied. Thus, on the basis of the output from the fuel supply switch 15, the control unit 14 determines at step S2 whether or not the fuel is supplied to the fuel tank.

If the judgement is affirmative at step S2, the execution proceeds to step S3, where the fuel property index $T_{50}$ stored in the RAM is cleared. Namely, the value of the index $T_{50}$ corresponding to the fuel property correction factor of 100 percent is set, such that no correction based on the fuel property is performed. Further, at step S4, the water temperature variable $WT_0$ is set at a high level, e.g., 120° C., at which the coolant water of the engine does not reach under normal operating condition, such that the steps S5 through S9 are ensured to be performed to determine the property of the fuel. The steps S3 and S4 are performed only once after the fuel supply.

By the way, when the values of $T_{50}$ or the water temperature stored in the battery-backed-up RAM is lost upon detaching the battery, for example, the control unit 14 executes the operations identical to those performed at steps S3 and S4. Thus, the values of the index $T_{50}$ corresponding to 100 percent fuel property correction factor and the water temperature data 120° C. are stored in the RAM, such that the steps S5 through S9 are ensured to be performed to determine the property of the fuel on the next occasion.

In the case of the above embodiment, the value of the index $T_{50}$ is read out from the two-dimensional map when the property of the fuel is determined at step S9. However, the correction factor for the fuel property may be stored in the ROM in the form of a two-dimensional map of parameters X and WT, such that the correction factor is directly read out of the two-dimensional map using the values of the two parameters X and WT.

As shown in FIG. 2, the difference between the amplitudes X of the feedback correction factor $K_2$ for the heavy and the light fuel is greater when the water temperature is lower. Thus, the property of the fuel can be determined more accurately when the water temperature is lower. Accordingly, the previous water temperature $WT_0$ is updated each time by the current water temperature WT at step S7 in FIG. 5b to improve the accuracy of the fuel property determination. The condition that the water temperature becomes lower than the previous measurement during idling is met when, for example, the vehicle is stopped.

In the case of the above embodiment, the property of the fuel is determined on the basis of the average amplitude $X_0$ of the feedback correction factor $K_2$ and the current water temperature WT. The property of the fuel may be determined, however, on the basis of of the average amplitude $X_0$ and the average water temperature $WT_A$ as follows.

At step S88 in FIG. 5c, the water temperature WT is stored in the variable WTn, as the difference P+-P- is stored at the amplitude Xn. At step S89, the average water temperature $WT_A=\Sigma WTn/N$ is calculated (where the summation is taken for n=1, 2, ... , N), together with the average amplitude $X_0$. At step S9, the index of the property of the fuel or the 50 percent distillation temperature of the fuel $T_{50}$ corresponding to the average amplitude $X_0$ and the average water temperature $WT_A$ is read out from the two-dimensional map as described above. The index of the property of the fuel $T_{50}$ is stored in the RAM backed up by a battery. Otherwise, the operations are performed as described above.

What is claimed is:

1. A fuel supply control system for an internal combustion engine, comprising:

fuel supply means for supplying a fuel to said internal combustion engine;

air/fuel ratio sensor means for detecting an air/fuel ratio of a mixture of air and fuel supplied to said internal combustion engine; and fuel supply control means, having all input coupled to said air/fuel ratio sensor means, for controlling said fuel supply means to adjust said air/fuel ratio to a theoretical ratio using a feedback control method based on an output of said air/fuel ratio sensor means; wherein said fuel supply control means includes: feedback correction factor calculation means for calculating a feedback correction factor from a deviation of said air/fuel ratio detected by said air/fuel ratio sensor means from said theoretical ratio; amplitude measurement means for determining an amplitude of said feedback correction factor; and fuel property judgment means for determining a property of said fuel on the basis of said amplitude of said feedback correction factor; said fuel supply control means controlling said fuel supply means in accordance with said property of said fuel determined by said fuel property judgment means.

2. A fuel supply control system as claimed in claim 1, further comprising:

an idling detector means for detecting an idling state of said internal combustion engine;

wherein said fuel supply control means has an input coupled to said idling detector means and said amplitude measurement means determines said amplitude of said feedback correction factor during a time when said idling detector means detects an idling state of said internal combustion engine.

3. A fuel supply control system as claimed in claim 1, further comprising:

temperature sensor means for detecting a temperature of said internal combustion engine;

wherein said fuel property judgment means has an input coupled to said temperature sensor means and determines said property of said fuel on the basis of said amplitude of said feedback correction factor and said temperature of said internal combustion engine detected by said temperature sensor means.

4. A fuel supply control system as claimed in claim 1, further comprising:

fuel storage means for storing said fuel supplied by said fuel supply means to said internal combustion engine; and fuel storage supply detector means for detecting an occurrence of fuel supply to said fuel storage means;

wherein said fuel supply control means has an input coupled to said fuel storage supply detector means and includes memory means for storing said property of said fuel determined by said fuel property judgment means, said fuel supply control means deleting said property of said fuel from said memory means when said fuel storage supply detector means detects an occurrence of fuel supply to said fuel storage means.

5. A fuel supply control system as claimed in claim 4, wherein said memory means comprises a RAM backed up by a battery.

6. A fuel supply control system as claimed in claim 1, wherein said amplitude measurement means determines an average of a plurality of amplitudes of said feedback correction factor, and said fuel property judgment means determines said property of said fuel on the basis of said average amplitude of said feedback correction factor.

\* \* \* \* \*